(12) United States Patent
Abe et al.

(10) Patent No.: US 8,232,837 B2
(45) Date of Patent: Jul. 31, 2012

(54) COMMUNICATION DEVICE AND BATTERY PACK CONTAINING COMMUNICATION DEVICE

(75) Inventors: Shuhei Abe, Tokyo (JP); Akira Ikeuchi, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 13/125,823

(22) PCT Filed: Oct. 19, 2009

(86) PCT No.: PCT/JP2009/068015
§ 371 (c)(1),
(2), (4) Date: Apr. 25, 2011

(87) PCT Pub. No.: WO2010/053005
PCT Pub. Date: May 14, 2010

(65) Prior Publication Data
US 2011/0206949 A1   Aug. 25, 2011

(30) Foreign Application Priority Data

Nov. 6, 2008   (JP) ................................. 2008-285839

(51) Int. Cl.
*H03H 11/00*   (2006.01)
*H01M 10/42*   (2006.01)
*H03K 19/096*   (2006.01)

(52) U.S. Cl. ............................... 327/574; 429/7; 326/93

(58) Field of Classification Search ...... 429/7; 327/574; 326/93
See application file for complete search history.

(56) References Cited

FOREIGN PATENT DOCUMENTS
JP        63-209219        8/1988
JP        2006-100963      4/2006

OTHER PUBLICATIONS
International Search Report mailed on Jan. 12, 2010.

*Primary Examiner* — Helen O Conley
(74) *Attorney, Agent, or Firm* — IPUSA, PLLC

(57) ABSTRACT

A communication device includes a first JK flip-flop (FF) outputting a first output signal in response to a first input signal at a J-input and a reversed signal of the first input signal at a K-input, and a second JK FF outputting a second output signal in response to a second input signal at a J-input and a reversed signal of the second input signal at a K-input. A clock input to a NAND gate (12) is replaced by a reversed signal of a Q-output of the second JK FF. A clock input to a NAND gate (13) is replaced by the reversed signal of the second input signal. A clock input to a NAND gate (22) is replaced by a reversed signal of a Q-output of the first JK FF. A clock input to a NAND gate (23) is replaced by the reversed signal of the first input signal.

5 Claims, 15 Drawing Sheets

| INPUT | | OUTPUT | |
| --- | --- | --- | --- |
| J | K | Q | $\overline{Q}$ |
| L | L | $Q_0$ | $\overline{Q_0}$ |
| L | H | L | H |
| H | L | H | L |
| H | H | $\overline{Q_0}$ | $Q_0$ |

COMMUNICATION DEVICE AND BATTERY PACK CONTAINING COMMUNICATION DEVICE

TECHNICAL FIELD

The present disclosure relates to a communication device and a battery pack containing a communication device, which are adapted to transmit a signal that is exchanged between a first input/output terminal and a second input/output terminal.

BACKGROUND ART

Conventionally, bidirectional communication circuits as illustrated in FIGS. 9 and 10 are known as a communication device which transmits and receives a signal. The bidirectional communication circuit of FIG. 9 is provided with four signal terminals. In this communication circuit, a signal input from an input terminal 92$h$ is processed by a level shift circuit G3 and the signal from the level shift circuit G3 is output to an output terminal 92$k$ through a transistor T2, and a signal input from an input terminal 92$i$ is processed by the level shift circuit G3 and the signal from the level shift circuit G3 is output to an output terminal 92$j$ through a transistor T1.

On the other hand, the bidirectional communication circuit of FIG. 10 is provided with two signal terminals. In this communication circuit, a signal input from an input/output terminal 91$c$ is processed by level shift circuits G1 and G2 and the signal from the level shift circuits G1 and G2 is output to an input/output terminal 91$d$ through a transistor T2, and a signal input from the input/output terminal 91$d$ is processed by the level shift circuits G1 and G2 and the signal from the level shift circuits G1 and G2 is output to the input/output terminal 91$c$ through a transistor T1.

Although the input/output signal paths in the bidirectional communication circuit of FIG. 10 can be reduced in number from those in the bidirectional communication circuit of FIG. 9, the bidirectional communication circuit of FIG. 10 must be arranged to include malfunction preventive measures for preventing a malfunction due to congestion of the simultaneously incoming signals (for example, fixing the signals to H level or L level). Such malfunction preventive measures may be inclusion of a certain malfunction prevention circuit in the internal circuit units between the input/output terminals, or provision of restrictions in the communication protocols for inhibiting the bidirectional signals from being sent to the communication circuit at the same time.

With respect to this problem, Patent Document 1 listed below discloses a transmission/reception switching circuit which controls a transmitting circuit and a receiving circuit which are arranged in a communication device which transmits and receives a signal that is exchanged between a first input/output terminal and a second input/output terminal. In this transmission/reception switching circuit, a signal at the first input/output terminal and a signal at the second input/output terminal are detected, and one of operation of either the transmitting circuit or the receiving circuit is selectively enabled so that the transmitting operation by the transmitting circuit and the receiving operation by the receiving circuit do not conflict with each other.

RELATED ART DOCUMENTS

Patent Documents

Patent Document 1: Japanese Laid-Open Patent Publication No. 2006-100963

DISCLOSURE OF THE INVENTION

Problem to be Solved by the Invention

In the related art as disclosed in the Patent Document 1, the switching control for operation of the transmitting circuit and the receiving circuit is performed by using the time counting of a counter. However, according to the related art, the switching of one of the transmitting circuit operation and the receiving circuit operation to the other can be started only after a time measured by the time counting of the counter has reached a predetermined time. Hence, the timing of transmission of a signal from a signal source circuit to a signal destination circuit is excessively restricted.

Accordingly, in one aspect, the present disclosure provides a communication device and a battery pack containing a communication device which are capable of transmitting a first signal from a transmitting circuit to a receiving circuit without causing a malfunction even when both the first signal from the transmitting circuit and a second signal from the receiving circuit in the bidirectional communication are input, and capable of arbitrarily changing the switching timing of transmission of the first signal and reception of the second signal.

Means to Solve the Problem

In an embodiment which solves or reduces one or more of the above-mentioned problems, the present disclosure provides a communication device including: a first input/output terminal; a second input/output terminal; a first JK flip-flop to output a first output signal from a Q-output or a reversed Q-output in response to a first input signal at a J-input and a reversed signal of the first input signal at a K-input; a second JK flip-flop to output a second output signal from a Q-output or a reversed Q-output in response to a second input signal at a J-input and a reversed signal of the second input signal at a K-input; a first logical conversion circuit to control a logic level of a signal input to the first input/output terminal so that the signal input to the first input/output terminal is input to the J-input of the first JK flip-flop as the first input signal and the second output signal is output from the first input/output terminal to an external device; and a second logical conversion circuit to control a logic level of a signal input to the second input/output terminal so that the signal input to the second input/output terminal is input to the J-input of the second JK flip-flop as the second input signal and the first output signal is output from the second input/output terminal to an external device, wherein a clock signal input to a NAND gate at the J-input of the first JK flip-flop is provided by a reversed signal of the Q-output of the second JK flip-flop, a clock signal input to a NAND gate at the K-input of the first JK flip-flop is provided by a reversed signal of the second input signal, a clock signal input to a NAND gate at the J-input of the second JK flip-flop is provided by a reversed signal of the Q-output of the first JK flip-flop, and a clock signal input to a NAND gate at the K-input of the second JK flip-flop is provided by a reversed signal of the first input signal.

Effect of the Present Disclosure

According to the communication device of the present disclosure, it is possible to transmit a first signal from a transmitting circuit to a receiving circuit without causing a malfunction even when both the first signal from the transmitting circuit and a second signal from the receiving circuit in the bidirectional communication are input, and it is possible to arbitrarily change the switching timing of transmission of the first signal and reception of the second signal.

BEST MODE FOR CARRYING OUT THE INVENTION

A description will be given of embodiments of the present disclosure with reference to the accompanying drawings.

Figure 1:
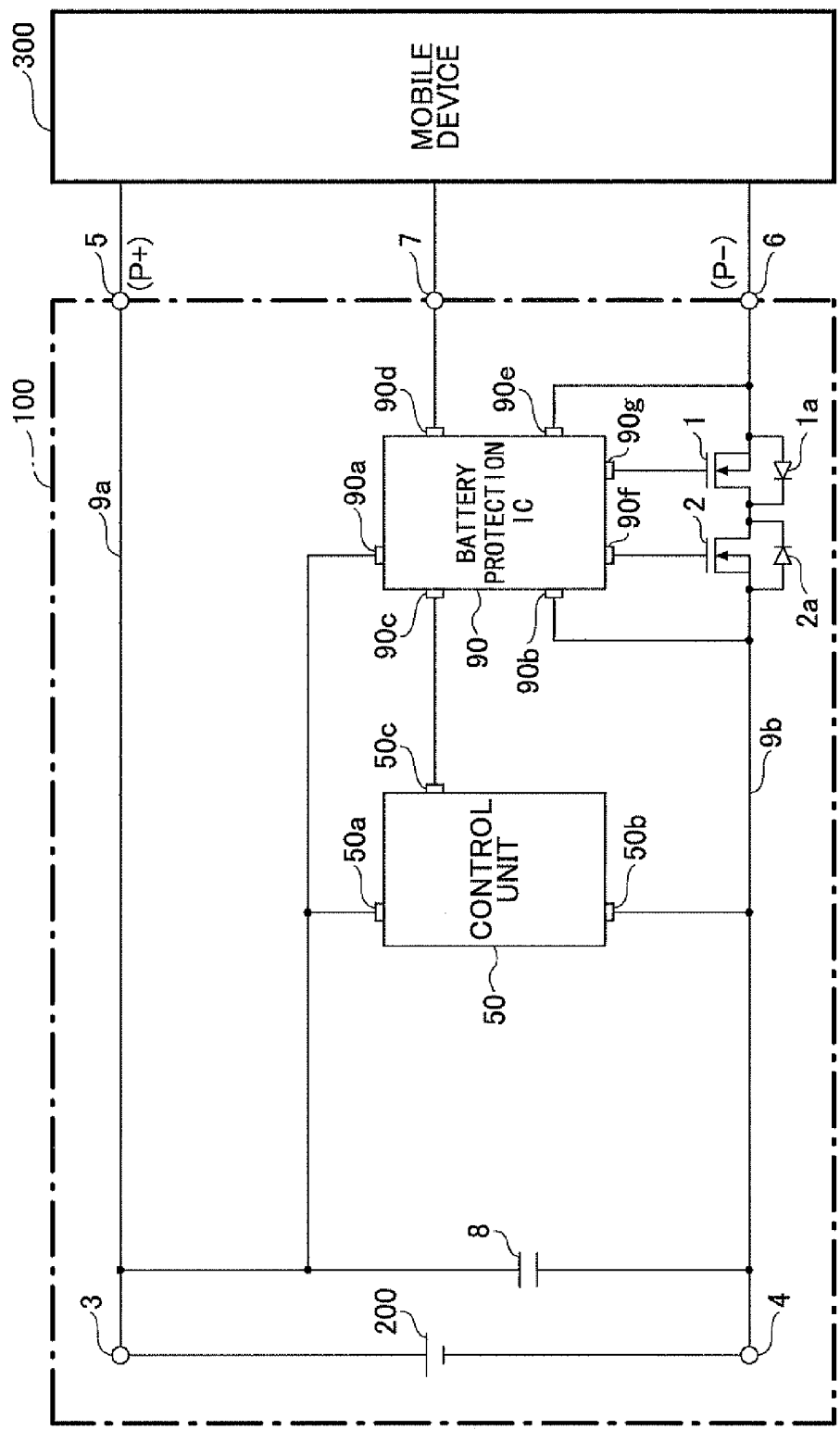
FIG. 1 is a diagram illustrating the composition of a battery pack according to an embodiment of the present disclosure.

FIG. 1 is a block diagram illustrating the composition of a battery pack 100 according to an embodiment of the present disclosure. The battery pack 100 is a module component device in which a battery protection device and a secondary battery 200 are arranged therein. The battery protection device includes input/output terminals 5 and 6, switching elements 1 and 2, a battery protection IC 90, and a control unit 50. The secondary battery 500 may be a lithium ion battery, a nickel hydride battery, or a double-conductive-layered capacitor. A mobile device 300 uses the secondary battery 200 provided in the battery pack 100 as a power supply. The charging/discharging of the mobile device 300 is performed by the battery pack 100 through the input/output terminals 5 and 6. The switching elements 1 and 2 are provided in the charging/discharging paths 9 (9a and 9b) for switching one of connection and disconnection between the input/output terminals 5 and 6 of the battery pack 100 and the electrode terminals 3 and 4 of the secondary battery 200. The battery protection IC 90 is arranged to control the switching operation of the switching elements 1 and 2. The control unit 50 is arranged to monitor battery information of the secondary battery 200, including the charging state of the secondary battery 200 etc. The control unit 50 may be arranged in the battery protection IC 90. The control unit 50 arranged in the battery protection IC 90 may control the switching operation of the switching elements 1 and 2.

The battery pack 100 may be incorporated in the mobile device 300, or may be externally attached to the mobile device 300. The mobile device 300 may be a portable electronic device which can be carried by a user. For example, the mobile device 300 may be a mobile phone arranged to have a wireless-communication function. Alternatively, the mobile device 300 may be one of an information terminal device, such as a PDA or a mobile personal computer, a camera, a game machine, an audio player, a video player, etc.

The battery pack 100 is detachably connected to the mobile device 300 through the input/output terminals (or the positive-electrode input/output terminal 5 and the negative-electrode input/output terminal 6) and a communication terminal 7. The positive-electrode input/output terminal 5 is connected to a positive-electrode terminal of the mobile device 300 and electrically connected to the positive terminal 3 of the secondary battery 200 via the charging/discharging path 9a. The negative-electrode input/output terminal 6 is connected to a negative-electrode terminal of the mobile device 300 and electrically connected to the negative electrode 4 of the secondary battery 200 via the charging/discharging path 9b. The communication terminal 7 is connected to a communication terminal of the mobile device 300 and connected to a terminal 90d of the battery protection IC.

The switching elements 1 and 2 are connected in series to allow switching of one of the conduction and disconnection of the charging/discharging path 9b between the negative electrode 4 of the secondary battery 200 and the negative-electrode input/output terminal 6. The switching element 1 is a first switching unit that permits switching of one of interruption and conduction of the charging current to the secondary battery 200 flowing through the charging/discharging path 9 in the charging direction. The switching element 2 is a second switching unit that permits switching of one of interruption and conduction of the discharging current from the secondary battery 200 flowing through the charging/discharging path 9 in the discharging direction. Charging of the secondary battery 20 is permitted when the switching element 1 is in an ON state, and charging of the secondary battery 200 is inhibited when the switching element 1 is in an OFF state. Discharging of the secondary battery 200 is permitted when the switching element 2 is in an ON state, and discharging of the secondary battery 200 is inhibited when the switching element 2 is in an OFF state.

For example, the switching elements 1 and 2 are made of a semiconductor chip having a parasitic diode, such as a MOSFET or an IGBT. The switching element 1 is arranged between the negative electrode 4 and the negative-electrode input/output terminal 6, such that the forward direction of the parasitic diode 1a accords with the discharging direction of the secondary battery 200. The switching element 2 is arranged between the negative electrode 4 and the negative-electrode input/output terminal 6, such that the forward direction of the parasitic diode 2a accords with the charging direction of the secondary battery 200. Alternatively, each of the switching elements 1 and 2 may be made of a bipolar transistor in which a diode is arranged between the collector and the emitter in the direction as illustrated.

The control unit 50 is arranged to communicate with the mobile device 300 through the battery protection IC 90. The control unit 50 transmits the battery information, including the battery state of the secondary battery 200, to the mobile device 300, and receives a signal, such as a command signal, from the mobile device 300. For example, the control unit 50 is arranged to include a temperature detecting unit to detect a temperature of the secondary battery 200, a voltage detecting unit to detect a voltage of the secondary battery 200, a current detecting unit to detect a charging/discharging current of the secondary battery 200, an AD converter to convert, into a digital value, an analog voltage value output from each of the respective detecting units and indicating a detection result, a processing unit (which may be composed of a logic circuit or a microcomputer) to perform processing of determining a degradation of the secondary battery 200 or processing of computing the remaining capacity of the secondary battery 200, and a memory (which may be composed of a storage device, such as an EEPROM or a flash memory) to store the characteristic data for specifying the characteristics of each component part of the secondary battery 200 and the battery pack 100 and the intrinsic data of the battery pack 100 for use in the processing by the processing unit.

The battery protection. IC 90 is a communication device including a communication interface circuit which transmits a signal from the control unit 50 to the mobile device 300, and transmits a signal from the mobile device 300 to the control unit 50.

Figure 2:
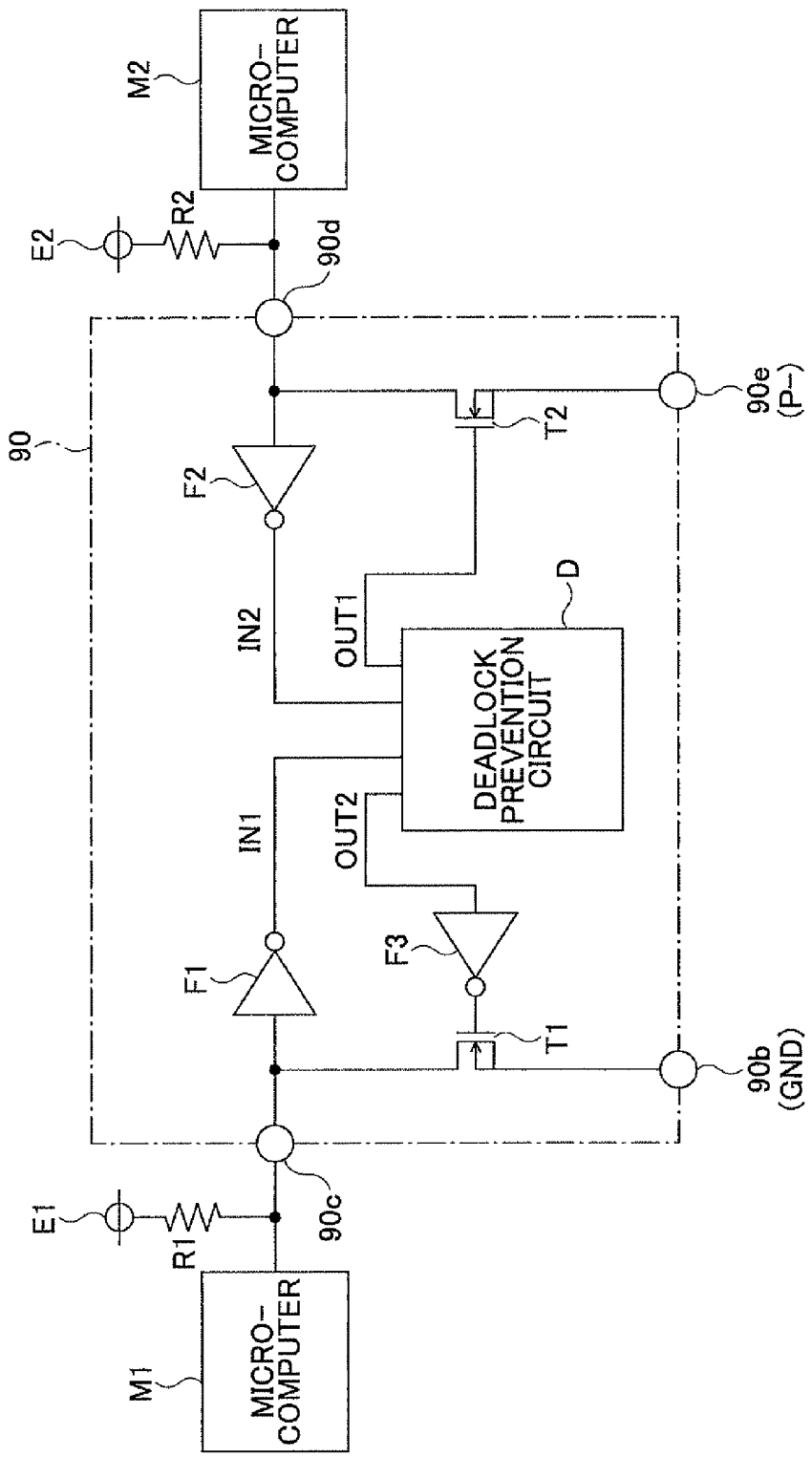
FIG. 2 is a diagram illustrating the composition of a battery protection IC of a first embodiment of the present disclosure.

FIG. 2 illustrates the composition of a battery protection IC 90 of a first embodiment of the present disclosure. The battery protection IC 90 transmits a signal exchanged between a microcomputer M1 of the control unit 50 and a microcomputer M2 of the mobile device 300. A signal transmitted by the microcomputer M1 is input to a deadlock prevention circuit D via an inverter F1 as an input signal IN1. The deadlock prevention circuit D outputs an output signal OUT1 based on the input signal IN1 and drives a transistor T2 by the output signal OUT1. Hence, the transmitting signal of the microcomputer M1 is input as the input signal IN via a terminal 90c, and this signal is transmitted to the microcomputer M2 via the terminal 90d by turning on and off of the transistor T2 which is driven according to the output signal OUT1 corresponding to the input signal IN1. On the other hand, a signal transmitted by the microcomputer M2 is input to the deadlock prevention circuit D via an inverter F2 as an input signal IN2. The deadlock prevention circuit D outputs an output signal OUT2 based on the input signal IN2 and drives a transistor T1 by the output signal OUT2. Hence, the transmitting signal of the microcomputer M2 is input via the terminal 90d as the input signal IN2, and this signal is transmitted to the microcomputer M1 via the terminal 90c by turning on and off of the transistor T1 which is driven according to the output signal OUT2 corresponding to the input signal IN2.

The signal which is transmitted or received by the microcomputer M1 is transmitted through the first logical conversion circuit, and the signal transmission is defined by the logic level of the signal at the single terminal 90c. The first logical conversion circuit includes the inverter F1 which receives the signal from the terminal 90c as the input signal IN1 and outputs this input signal IN1 to the deadlock prevention circuit D, a resistor R1 which is arranged to pull up the voltage at the input end of the inverter F1 to a voltage E1, the inverter F3 which receives the output signal OUT2 output from the deadlock prevention circuit D, and the transistor T1 which is arranged to short-circuit the input end (the terminal 90c) of the inverter F1 to a ground terminal, connected to the terminal 90b, in response to the output signal output from the inverter F3.

Similarly, the signal which is transmitted or received by the microcomputer M2 is transmitted through the second logical conversion circuit, and the signal transmission is defined by the logic level of the signal at the single terminal 90d. The second logical conversion circuit includes the inverter F2 which receives the signal from the terminal 90d as the input signal IN2 and outputs this input signal IN2 to the deadlock prevention circuit D, a resistor R2 which is arranged to pull up the voltage at the input end of the inverter F2 to a voltage E2 (which may be equal to the voltage E1), and the transistor T2 which is arranged to short-circuit the input end (the terminal 90d) of the inverter F2 to the ground terminal, connected to the terminal 90e, in response to the output signal OUT1 output from the deadlock prevention circuit D. Alternatively, the resistors R1 and R2 may be arranged within the battery protection IC 90, and the inverters F1, F2 and F3 and the transistors T1 and T2 may be arranged outside the battery protection IC 90.

The deadlock prevention circuit D of this embodiment is arranged such that, if the input signals IN1 and IN2 are input, the preceding one of the input signals deactivates the following one of the input signals, a priority is given only to the preceding input signal, and the preceding input signal is output to the next stage circuit. Accordingly, even if the input signals IN1 and IN2 are input, the deadlock prevention circuit D of this embodiment can prevent the logic level of the signal which is transmitted in the protection IC 90 from being fixed to the logic level of either H or L, and can avoid the problem that the timing of transmission of the signal from the signal source circuit to the signal destination circuit is excessively restricted.

In the deadlock prevention circuit D of this embodiment, the communication interface circuit for communicating with the two microcomputers is arranged to include the logical conversion circuits as illustrated in FIG. 2. When priority is given to the input signal IN1 in the deadlock prevention circuit D of this embodiment, the transistor T1 is maintained in an OFF state (namely, the output signal OUT2 is maintained at the H level) even if the logic level of the input signal IN2 changes, and the circuit operation is performed to output the output signal OUT1 according to the input signal IN1. On the other hand, when priority is given to the input signal 1N2 in the deadlock prevention circuit D of this embodiment, the transistor T2 is maintained in an OFF state (namely, the output signal OUT1 is maintained at the L level) even if the logic level of the input signal IN1 changes, and the circuit operation is performed to output the output signal OUT2 according to the input signal IN2.

Figure 3:
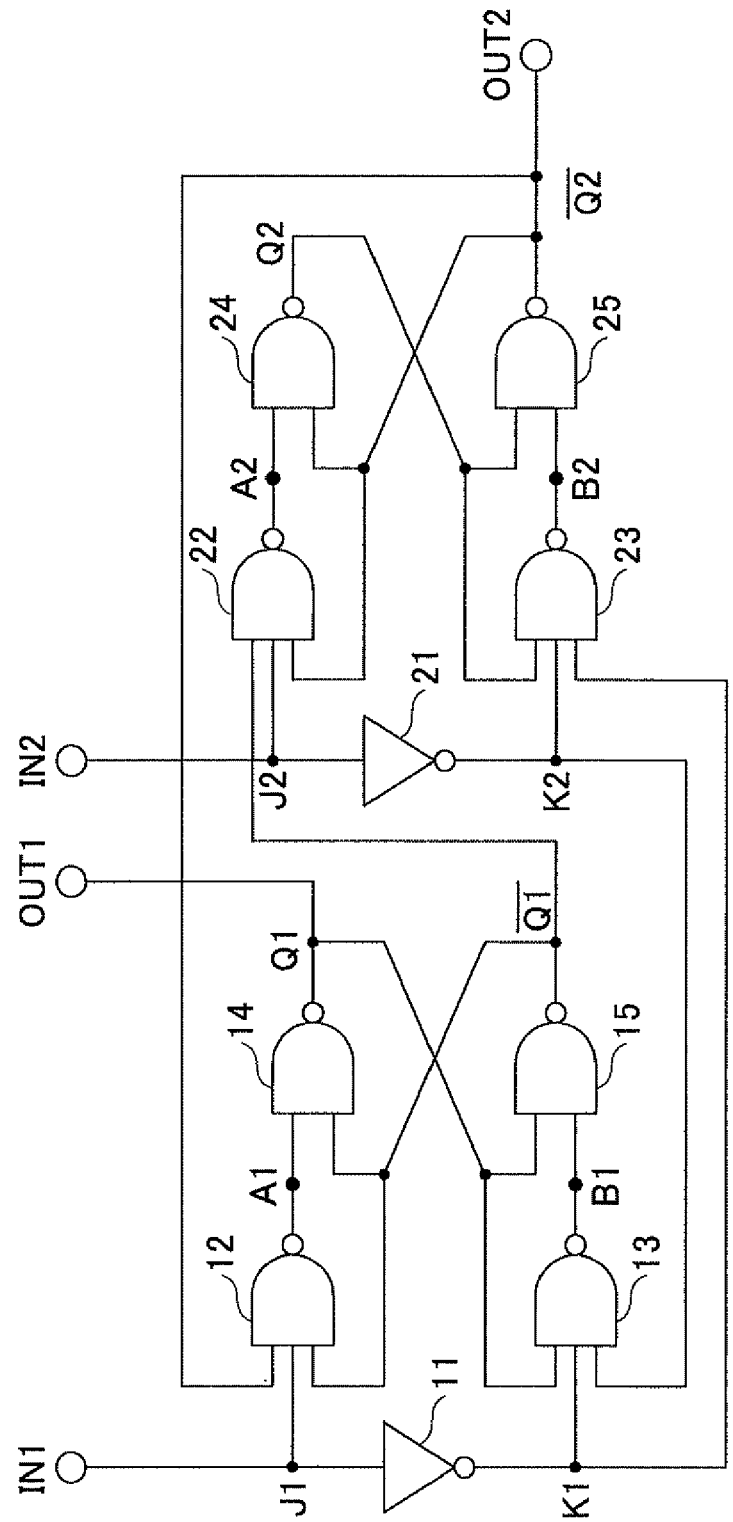
FIG. 3 is a diagram illustrating the composition of a deadlock prevention circuit.
Figures 11, 12:
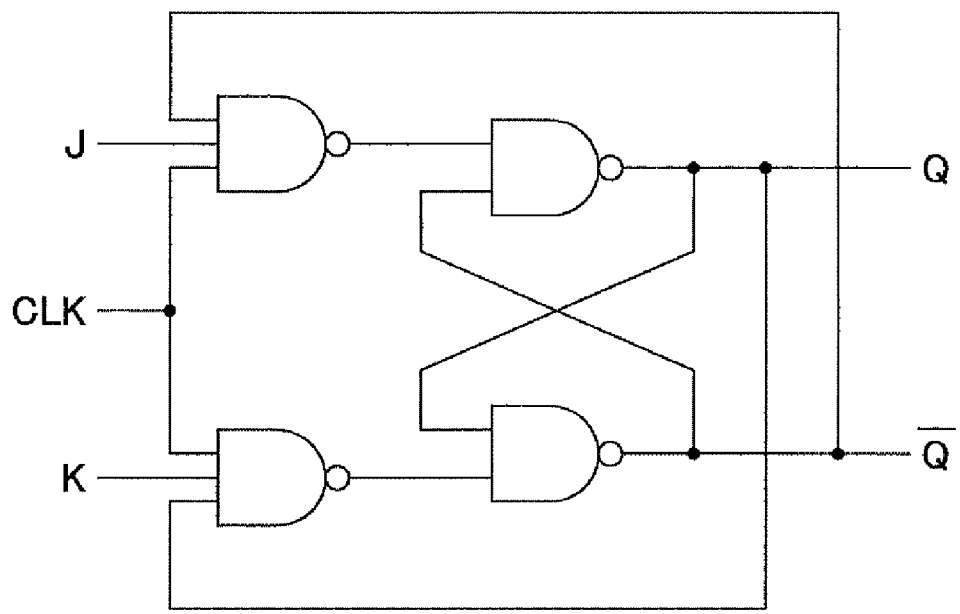
FIG. 11 is a diagram illustrating the circuit configuration of a JK flip-flop which is composed of NAND gates.
FIG. 12 is a diagram for explaining a truth table of the JK flip-flop of FIG. 11.

FIG. 3 illustrates the composition of a deadlock prevention circuit D which carries out the above-described circuit operation. The deadlock prevention circuit D is a sequential circuit which is composed of a combination of two JK flip-flops in which the input method of the clock signals is modified. For reference purposes, FIG. 11 illustrates the composition of a JK flip-flop which is composed of NAND gates, and FIG. 12 is a diagram for explaining a truth table of the JK flip-flop. In the JK flip-flop, when a clock signal CLK is at the L level, the previous state is held by the output Q. Only the truth table of the JK flip-flop when the clock signal CLK is at the H level is illustrated in FIG. 12, and the illustration of the truth table thereof when the clock signal CLK is at the L level is omitted.

The deadlock prevention circuit D of FIG. 3 is arranged to include a first modified J-K flip-flop and a second modified J-K flip-flop. In the first modified J-K flip-flop, an input signal IN1 is input to a J-input (J1), a reversed signal of the input signal IN1 output from an inverter 11 is input to a K-input (K1), and, in response to these inputs, an output signal OUT1 is output from a Q-output (Q1). In the second modified J-K flip-flop, an input signal IN2 is input to a J-input (J2), a reversed signal of the input signal IN2 output from an inverter 21 is input to a K-input (K2), and, in response to these inputs, an output signal OUT2 is output from a reversed Q-output (bar Q2).

If the control of the logic level is in conformity with an external circuit, the output signal OUT1 may be output from a reversed Q-output (bar Q1) after the control of the logic level is made in conformity with the external circuit. Similarly, the output signal OUT2 may be output from a Q-output (Q2). For example, as illustrated in FIG. 2, the control of the logic levels of the input/output signals of the deadlock prevention circuit D may be made in conformity by inserting the inverter F3 in the first logical conversion circuit.

The first modified J-K flip-flop in the deadlock prevention circuit D of FIG. 3 is arranged by modification of the JK flip-flop of FIG. 11. The input part of a clock signal CLK in the JK flip-flop composed of the NAND gates as illustrated in FIG. 11 is modified as follows. A clock signal input to a NAND gate 12 at the J-input of the first modified J-K flip-flop is provided by a reversed signal of the Q-output of the second modified J-K flip-flop, and a clock signal input to a NAND gate 13 at the K-input of the first modified J-K flip-flop is provided by a reversed signal of the input signal 1N2 output from the inverter 21 as a clock signal.

Similarly, the second modified J-K flip-flop in the deadlock prevention circuit D of FIG. 3 is arranged by modification of the JK flip-flop of FIG. 11. The input part of a clock signal CLK in the JK flip-flop composed of the NAND gates as illustrated in FIG. 11 is modified as follows. A clock signal input to a NAND gate 22 at the J-input of the second modified J-K flip-flop is provided by a reversed signal of the Q-output of the first modified J-K flip-flop, and a clock signal input to a NAND gate 23 at the K-input of the second modified J-K flip-flop is provided by a reversed signal of the input signal IN1 output from the inverter 11.

Figure 4:
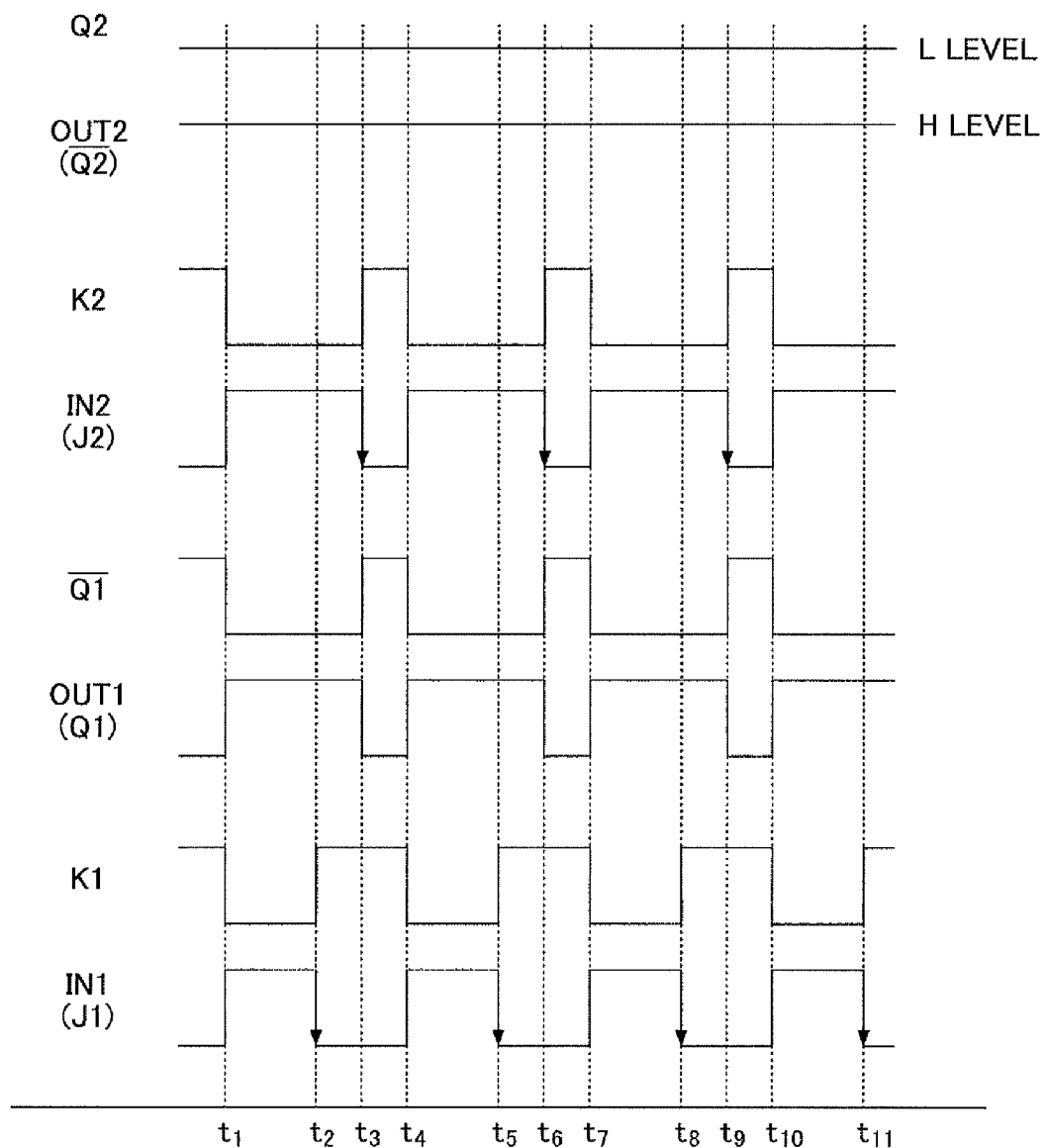
FIG. 4 is a timing chart for explaining states of respective parts in the deadlock prevention circuit when priority is given to an input signal IN1.

FIG. 4 is a timing chart for explaining states of the respective parts in the deadlock prevention circuit D when priority is given to the input signal IN1. In this case, the relationship in the logic level between the input signal IN2 and the output signal OUT1 is controlled by the inverter F2, the transistor T2, and the resistor R2 as illustrated in FIG. 2. As illustrated in FIG. 4, even if the logic level of the input signal IN2 changes, the output signal OUT1 which is synchronized with the input signal IN1 is output while the output signal OUT2 is maintained at the H level to maintain the transistor T1 in an OFF state.

Figure 5:
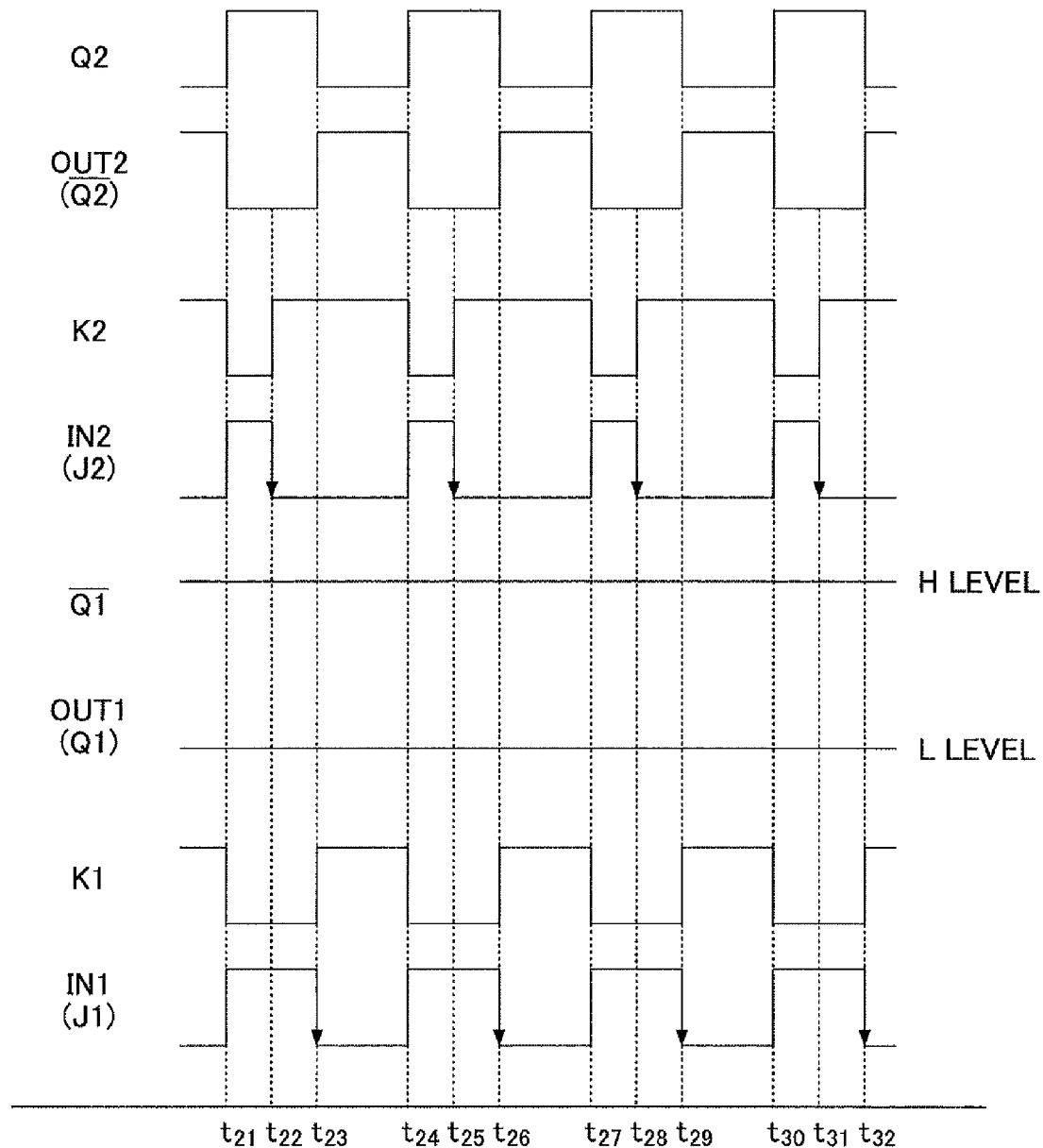
FIG. 5 is a timing chart for explaining states of respective parts in the deadlock prevention circuit when priority is given to an input signal IN2.

On the other hand, FIG. 5 is a timing chart for explaining states of the respective parts in the deadlock prevention circuit D when priority is given to the input signal IN2. In this case, the relationship in the logic level between the input signal IN1 and the output signal OUT2 is controlled by the inverters F1 and F3, the transistor T1, and the resistor R1 as illustrated in FIG. 2. As illustrated in FIG. 5, even if the logic level of the input signal IN1 changes, the output signal OUT2 which is synchronized with the input signal IN2 is output while the output signal OUT1 is maintained at the L level to maintain the transistor T2 in an OFF state.

As illustrated in FIG. 4, the deadlock prevention circuit D of this embodiment is arranged so that, when the input signal IN2 is at the H level at a falling edge of the input signal IN1 (or when the input signal IN1 is at the L level at a falling edge of the input signal IN2), the input signal IN1 takes priority over the input signal 1N2 so that the input signal IN1 is input to the deadlock prevention circuit D ahead of the input signal IN2, and the output signal OUT1 which is synchronized with the input signal IN1 is output. At the same time, the input of the input signal 1N2 to the deadlock prevention circuit D is cancelled, and the output signal OUT2 is maintained at the H level irrespective of a change in the logic level of the input signal IN2.

As illustrated in FIG. 5, the deadlock prevention circuit D of this embodiment is arranged so that, when the input signal IN2 is at the L level at a falling edge of the input signal IN1 (or when the input signal IN1 is at the H level at a falling edge of the input signal IN2), the input signal IN2 takes priority over the input signal IN1 so that the input signal IN2 is input to the deadlock prevention circuit D ahead of the input signal IN1, and the output signal OUT2 which is synchronized with the input signal 1N2 is output. At the same time, the input of the input signal IN1 to the deadlock prevention circuit D is cancelled, and the output signal OUT1 is maintained at the L level irrespective of a change in the logic level of the input signal IN1.

Therefore, according to the compositions of FIG. 2 and FIG. 3, even if both the input signals IN1 and IN2 are input (even if both the logic levels of the input signals change), the transmitting signal of the microcomputer M1 which takes priority over the transmitting signal of the microcomputer M2 can be correctly transmitted to the microcomputer M2 by turning on and off of the transistor T2 while the transmitting signal of the microcomputer M2 which takes priority over the transmitting signal of the microcomputer M1 can be correctly transmitted to the microcomputer M1 by turning on and off of the transistor T1, without fixing the signal to one of the logic levels.

Figure 6:
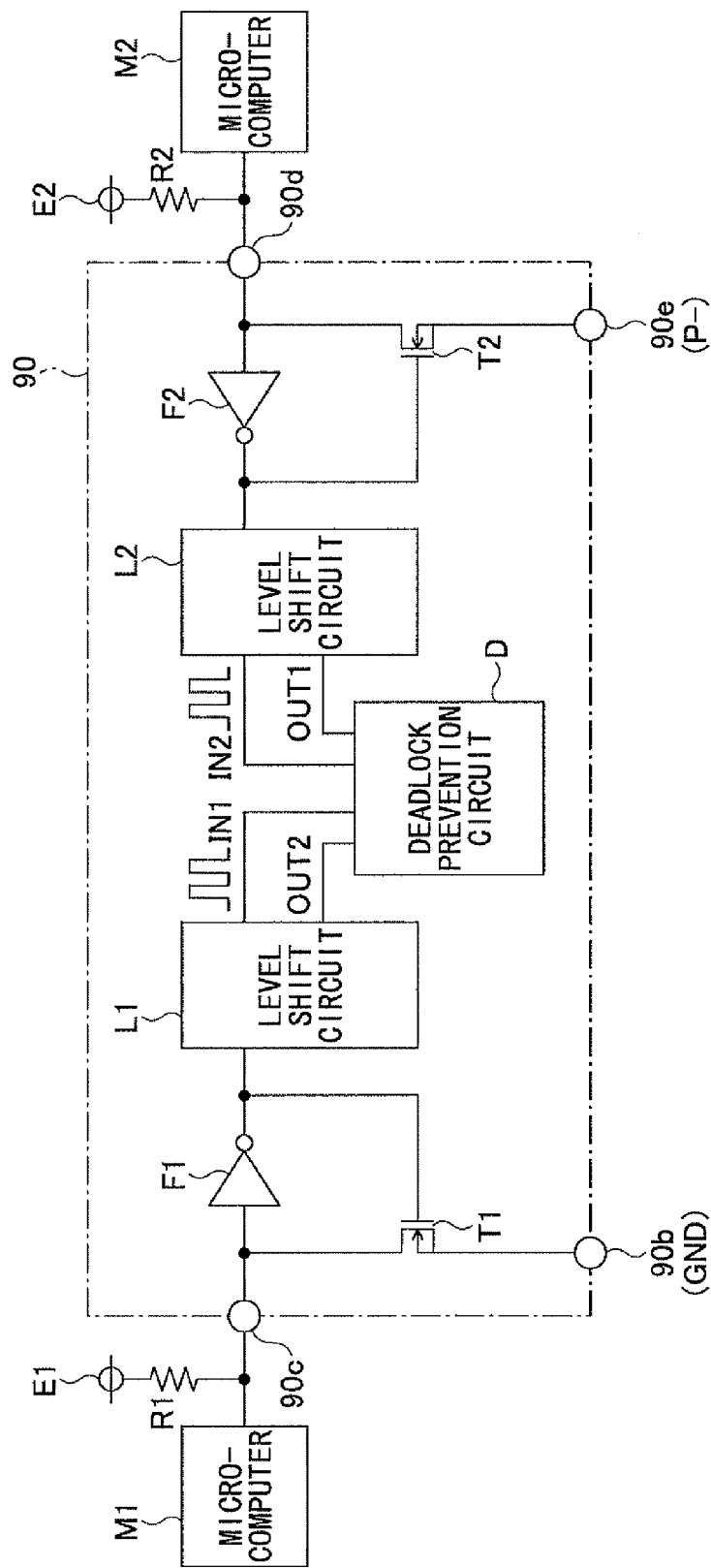
FIG. 6 is a diagram illustrating the composition of a battery protection IC of a second embodiment of the present disclosure.

Next, the composition of a battery protection IC 90 of a second embodiment of the present disclosure will be described. FIG. 6 illustrates the composition of the battery protection IC 90 of the second embodiment. In this battery protection IC 90, a level shift circuit L1 is added a the first logical conversion circuit, and a level shift circuit L2 is added as the second logical conversion circuit. The composition of the deadlock prevention circuit D in this embodiment is essentially the same as that illustrated in FIG. 3. The transmission paths for transmitting the signals transmitted or received by the microcomputers M1 and M2 are essentially the same as those described above.

Figure 7:
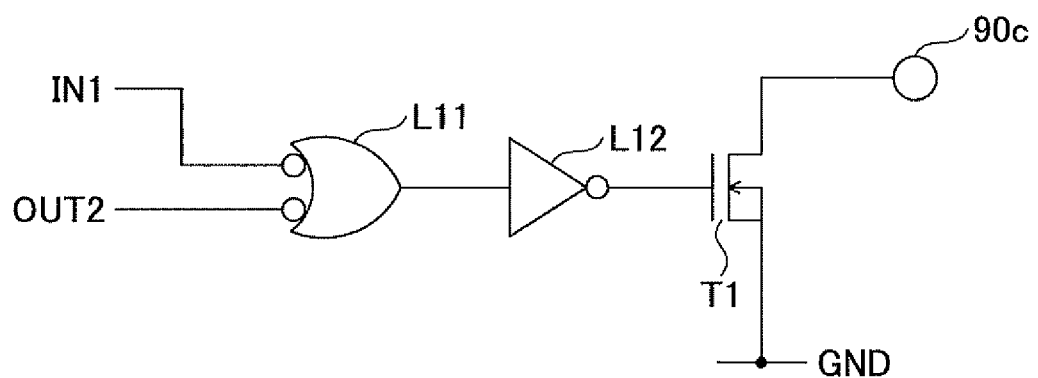
FIG. 7 is a diagram illustrating the composition of a level shift circuit which is a first logical conversion circuit.

FIG. 7 illustrates the composition of the level shift circuit L1 in this embodiment. In the level shift circuit L1, a NAND gate L11 is a circuit which receives the output signal OUT2, and when the output signal OUT2 is maintained at the H level, the transistor T1 is turned on and off in synchronization with the pulse of the input signal IN1. Although the inverter F1 illustrated in FIG. 6 is omitted in FIG. 7, the logic level of the input signal IN1 is the same as the logic level of the output signal of the inverter F1 (which is the same as the logic level at the gate of the transistor T1).

Figure 8:
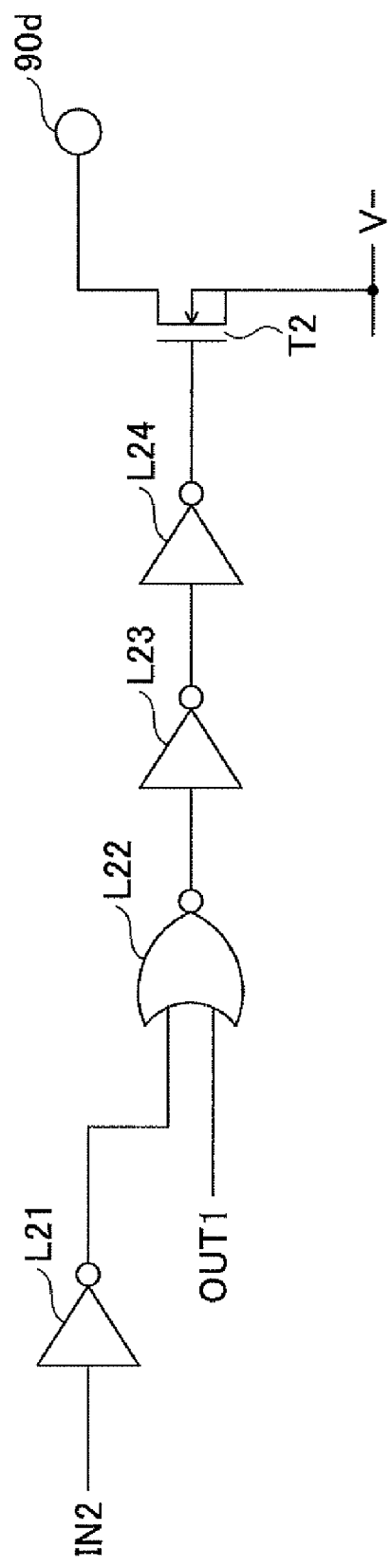
FIG. 8 is a diagram illustrating the composition of a level shift circuit which is a second logical conversion circuit.
Figure 9:
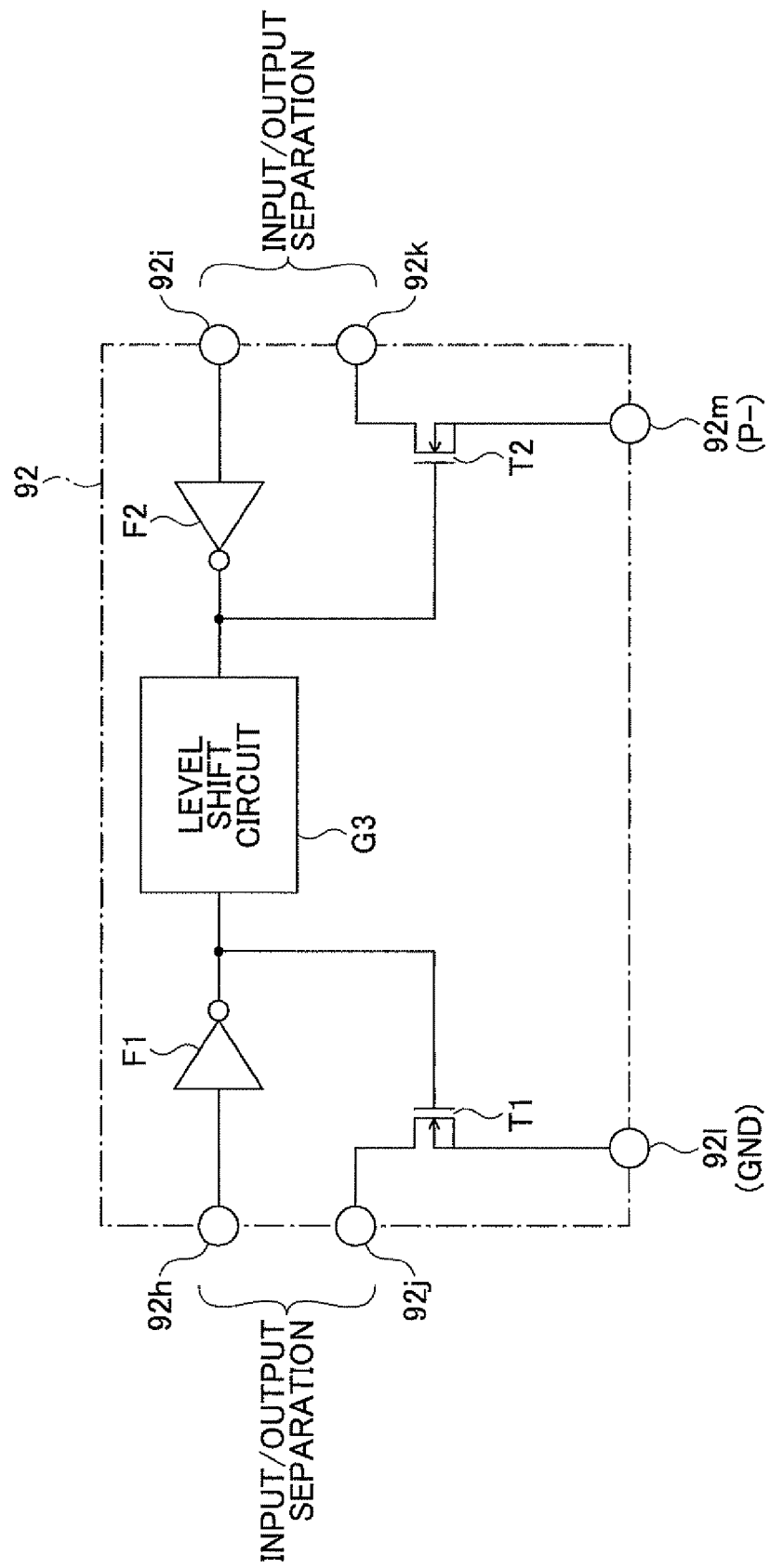
FIG. 9 is a diagram illustrating the composition of a bidirectional communication circuit according to the related art.
Figure 10:
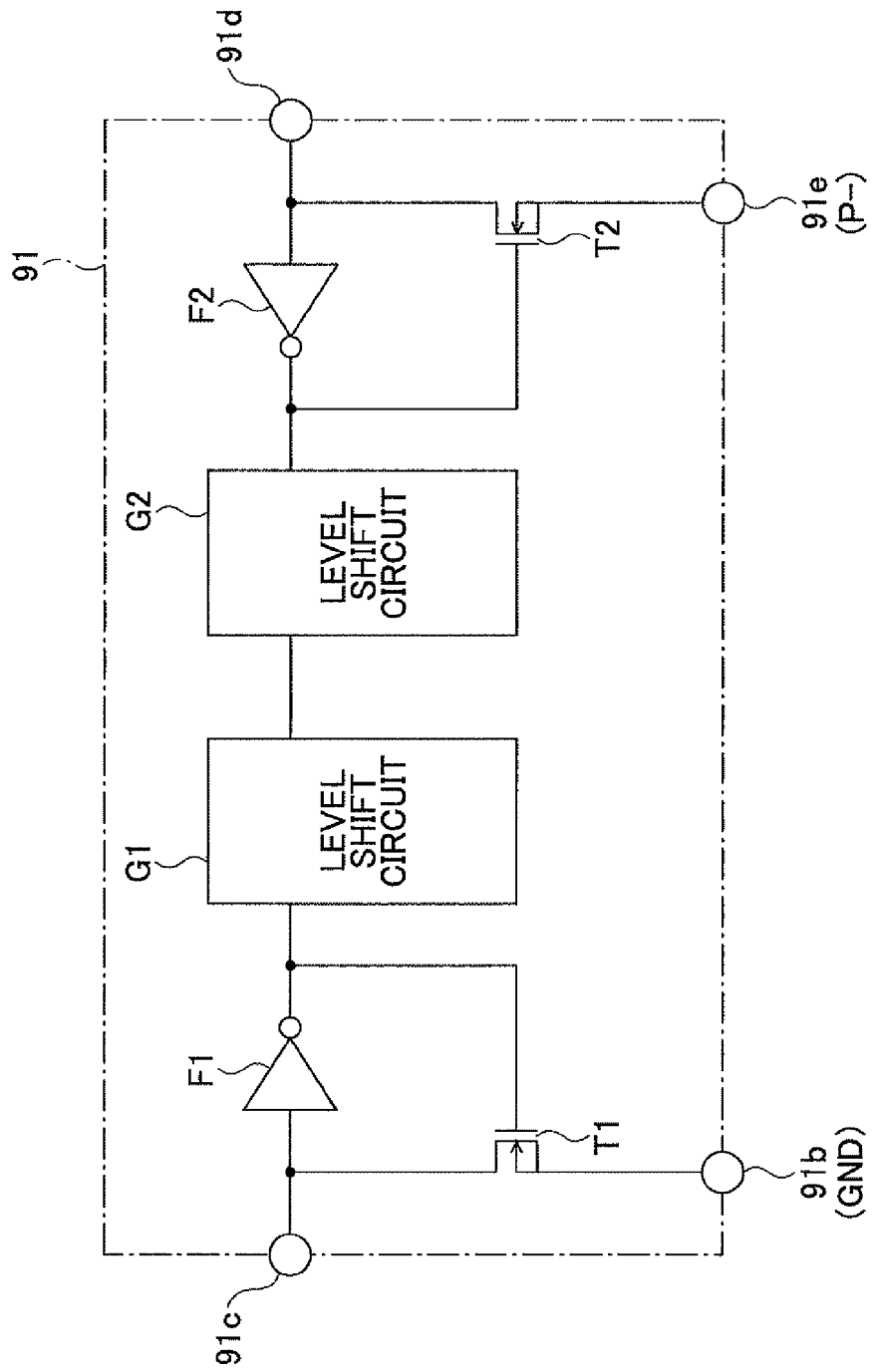
FIG. 10 is a diagram illustrating the composition of a bidirectional communication circuit according to the related art.

FIG. 8 illustrates the composition of the level shift circuit L2 in this embodiment. In the level shift circuit L2, a NOR gate L22 is a circuit which receives the output signal OUT1, and when the output signal OUT1 is maintained at the L level, the transistor T2 is turned on and off in synchronization with the pulse of the input signal 1N2. Although the inverter F2 illustrated in FIG. 6 is omitted in FIG. 8, the logic level of the input signal IN2 is the same as the logic level of the output signal of the inverter F2 (which is the same as the logic level at the gate of the transistor T2).

In the deadlock prevention circuit D of this embodiment, the communication interface circuit for communicating with the two microcomputers is arranged to include the logical conversion circuits as illustrated in FIG. 6. Unlike the case of FIG. 2, when priority is given to the input signal IN1 in the deadlock prevention circuit D of this embodiment, even if the logic level of the input signal 1N2 changes, the output signal OUT2 is maintained at the H level for passing the input signal IN1 unconditionally, and the transistor T1 is turned on and off to control the logic level of the signal at the terminal 90c. At the same time, the circuit operation is performed to output the output signal OUT1 according to the input signal IN1. On the other hand, when priority is given to the input signal IN2, even if the logic level of the input signal IN1 changes, the output signal OUT1 is maintained at the L level for passing the input signal IN2 unconditionally, and the transistor T2 is turned on and off to control the logic level of the signal at the terminal 90d. At the same time, the circuit operation is performed to output the output signal OUT2 according to the input signal IN2.

When the compositions of FIG. 3 and FIGS. 6-8 are used, the timing charts for this embodiment are the same as the timing charts of FIGS. 4 and 5. Therefore, according to the compositions of FIG. 3 and FIGS. 6-8, even if both the input signals IN1 and IN2 are input, the transmitting signal of the microcomputer M1 which takes priority over the transmitting signal of the microcomputer M2 can be correctly transmitted to the microcomputer M2 by turning on and off of the transistor T2 while the transmitting signal of the microcomputer M2 which takes priority over the transmitting signal of the microcomputer M1 can be correctly transmitted to the microcomputer M1 by turning on and off of the transistor T1, without fixing the signal to one of the logic levels.

Figure 16:
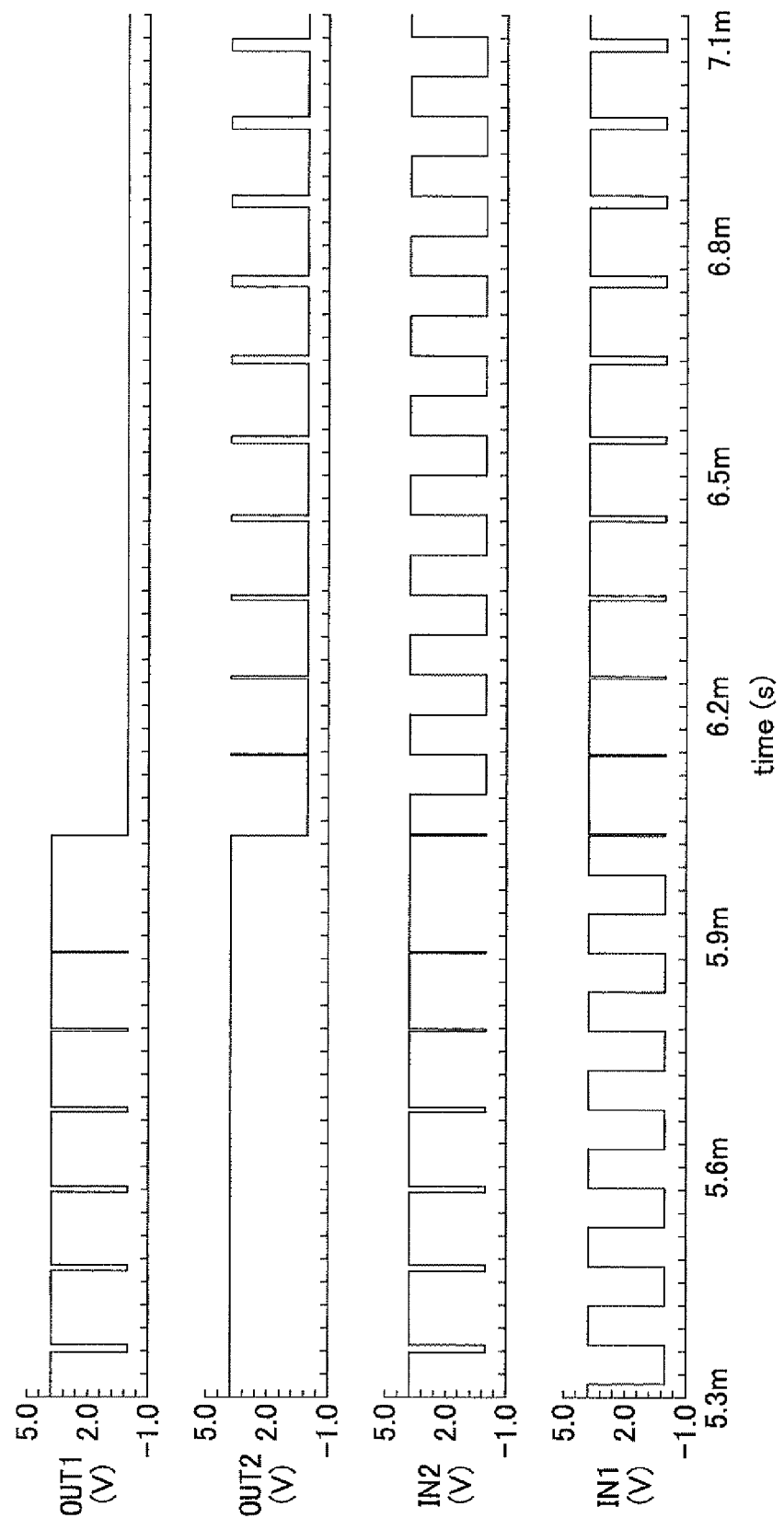
FIG. 16 is a diagram for explaining the simulation results when the battery protection IC having the composition of FIG. 2 or the composition of FIG. 6 operates.

FIG. 16 illustrates the simulation results when the battery protection IC 90 having the composition of FIG. 2 or the composition of FIG. 6 operates. There is illustrated the operation of the battery protection IC 90 when the square-wave input signals are input from the input/output terminals 90c and 90d. If the frequency of the signal input from the input/output terminal 90c is varied (or if the frequency of the signal input from the input/output terminal 90d is varied), the logic level of the other of the input signals at a falling edge of one of the input signals can be switched. By making use of the characteristics of the relationship between the logical levels of the input/output signals of the above-described deadlock prevention circuit D, one of giving priority to the input signal IN1 (the left-hand side half of FIG. 16) and giving priority to the input signal IN2 (the right-hand side half of FIG. 16) can be selectively performed without delay. This means that the microcomputer M1 or the microprocessor M2 can change arbitrarily the switching timing of transmission and reception of the signal by itself. That is, the switching between the transmitting operation and the receiving operation can be performed by changing the timing of outputting the output signal by the microcomputer M1 or the microcomputer M2 (for example, by changing the duty ratio of the output signal).

When priority is given to the input signal IN1 (the left-hand side half of FIG. 16), the output signal OUT1 synchronized with the input signal IN1 is output to the transistor T2 without deadlock, and the pulse generated by turning on and off of the transistor T2 driven by the output signal OUT1 can be detected by the microcomputer M2 through the terminal 90d, so that the content of information from the microcomputer M1 can be correctly recognized by the microcomputer M2. On the other hand, when priority is given to the input signal IN2 (the right-hand side half of FIG. 16), the output signal OUT2 synchronized with the input signal IN2 is output to the transistor T1 without deadlock, and the pulse generated by turning on and off of the transistor T1 driven by the output signal OUT2 can be detected by the microcomputer M1 through the terminal 90c, so that the content of information from the microcomputer M2 can be correctly recognized by the microcomputer M1.

As described above, the communication interface circuit for transmitting and receiving the signal between the control unit 50 in the battery pack 100 and the mobile device 300 can be provided by a simple circuit configuration, such as a combination of sequential circuits, and the present disclosure contributes to miniaturization of the battery pack 100.

The present disclosure is not limited to the above-described embodiments and variations and modifications may be made without departing from the scope of the present disclosure.

Figure 13:
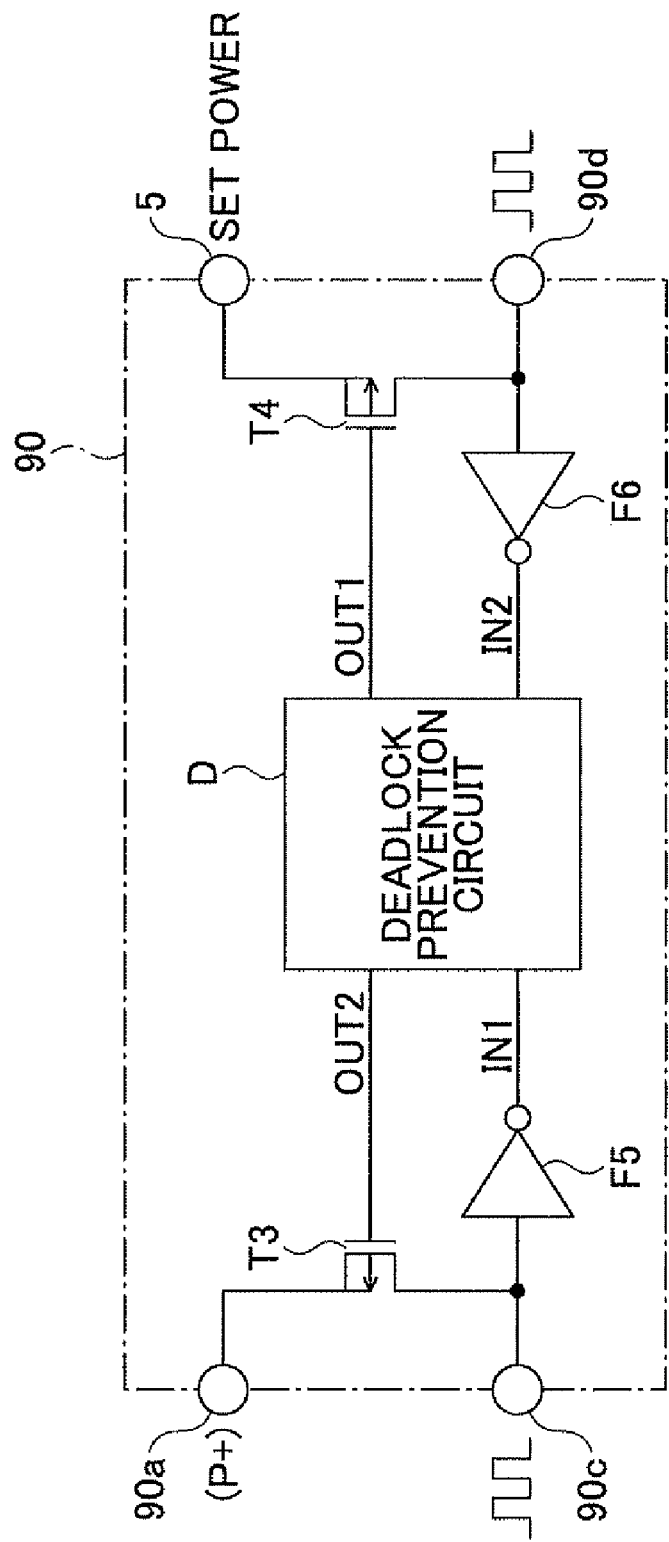
FIG. 13 is a diagram illustrating an example of an output format of the battery protection IC.
Figure 14:
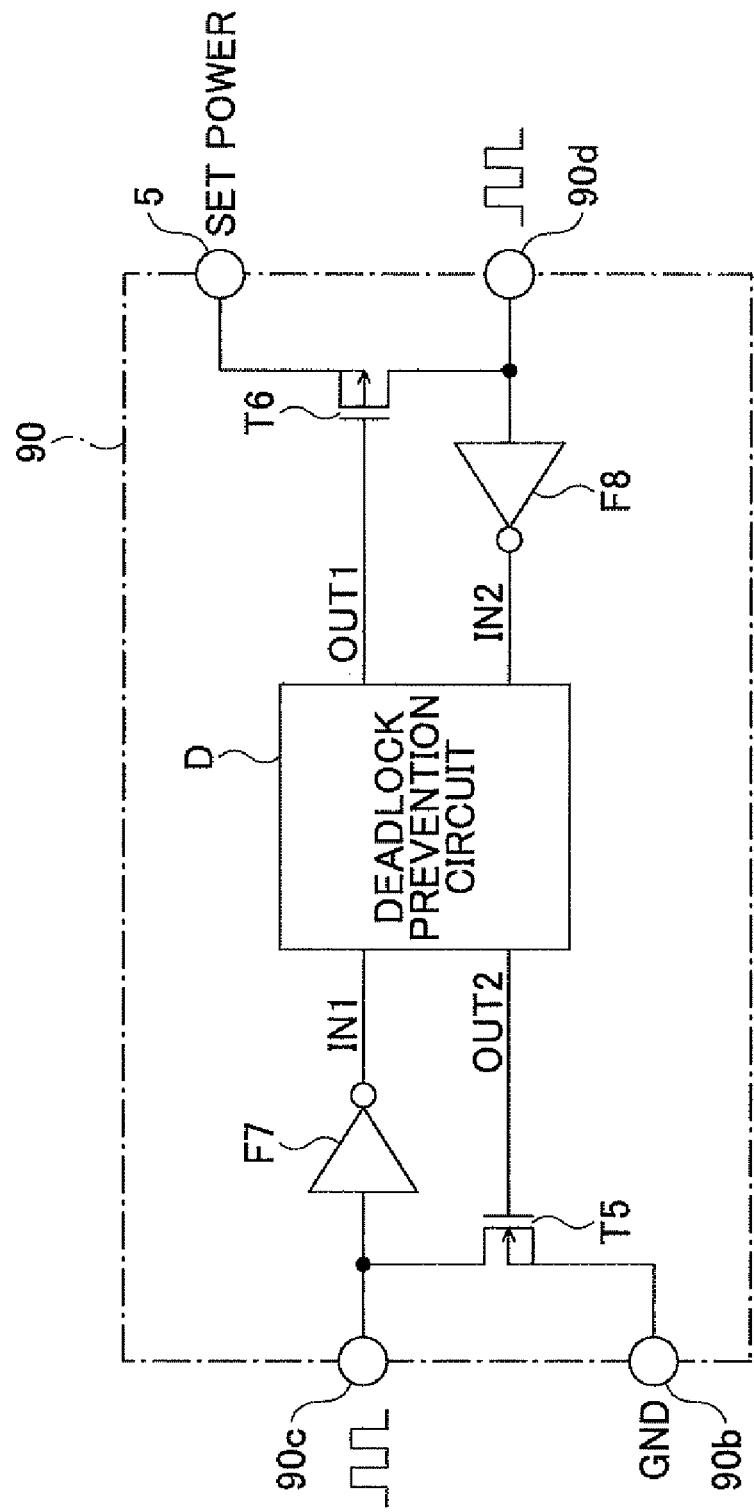
FIG. 14 is a diagram illustrating another example of the output format of the battery protection IC.
Figure 15:
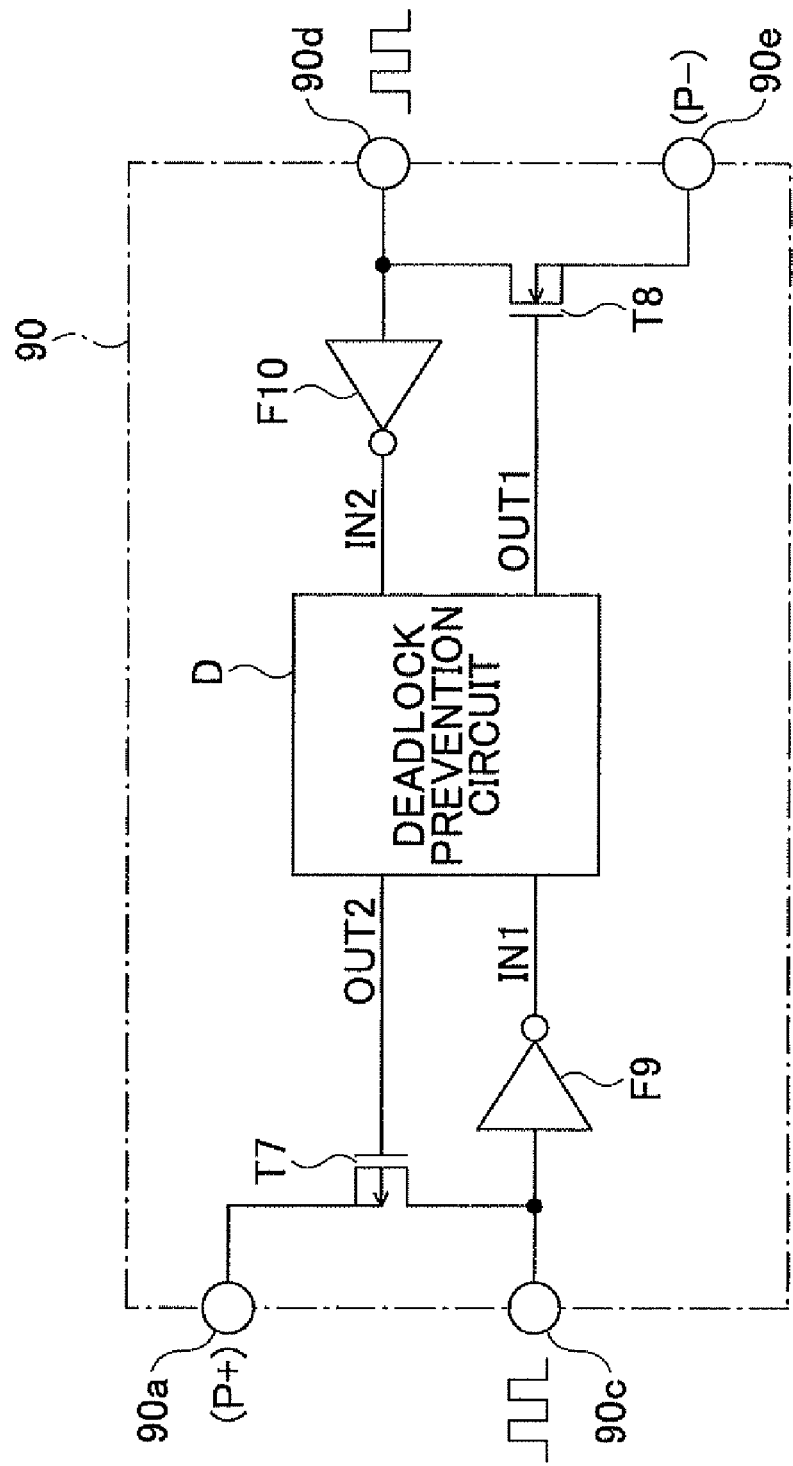
FIG. 15 is a diagram illustrating another example of the output format of the battery protection IC.

For example, as illustrated in FIGS. 13-15, appropriate functions may be chosen according to the characteristics of a communication module. As long as the logic levels of the input/output terminals of the protection IC 90 are matched, any appropriate I/O format of the logical conversion circuit provided between the deadlock prevention circuit D and each of the microcomputers may be used.

Even when the composition of the above-described embodiment is replaced by an equivalent logic circuit which is constructed in accordance with De Morgan theorem or others, the logic circuit would provide the same advantages as in the above-described embodiment.

The present international application is based upon and claims the benefit of priority of Japanese patent application No. 2008-285839, filed on Nov. 6, 2008, the contents of which are incorporated herein by reference in their entirety.

DESCRIPTION OF THE REFERENCE NUMERALS 50 control unit
90 battery protection IC
90c, 90d input/output terminals
100 battery pack
200 secondary battery
300 mobile device

The invention claimed is:
1. A communication device, comprising:
a first input/output terminal;
a second input/output terminal;
a first JK flip-flop to output a first output signal from a Q-output or a reversed Q-output in response to a first input signal at a J-input and a reversed signal of the first input signal at a K-input;
a second JK flip-flop to output a second output signal from a Q-output or a reversed Q-output in response to a second input signal at a J-input and a reversed signal of the second input signal at a K-input;
a first logical conversion circuit to control a logic level of a signal input to the first input/output terminal so that the signal input to the first input/output terminal is input to the J-input of the first JK flip-flop as the first input signal and the second output signal is output from the first input/output terminal to an external device; and
a second logical conversion circuit to control a logic level of a signal input to the second input/output terminal so that the signal input to the second input/output terminal is input to the J-input of the second JK flip-flop as the second input signal and the first output signal is output from the second input/output terminal to an external device,
wherein a clock signal input to a NAND gate at the J-input of the first JK flip-flop is provided by a reversed signal of the Q-output of the second JK flip-flop, a clock signal input to a NAND gate at the K-input of the first JK flip-flop is provided by a reversed signal of the second input signal, a clock signal input to a NAND gate at the J-input of the second JK flip-flop is provided by a reversed signal of the Q-output of the first JK flip-flop, and a clock signal input to a NAND gate at the K-input of the second JK flip-flop is provided by a reversed signal of the first input signal.

2. The communication device according to claim 1, wherein a signal input to or output from the first input/output terminal is exchanged between the communication device and a control unit, the control unit being arranged to communicate with an electronic device that uses a secondary battery as a power supply, and a signal input to or output from the second input/output terminal is exchanged between the communication device and the electronic device.

3. A battery pack in which the communication device according to claim 2 and the secondary battery are arranged.

4. The communication device according to claim 1, wherein the first logical conversion circuit comprises a transistor which is arranged to short-circuit the first input/output terminal to a ground terminal in response to the second output signal output from the second JK flip-flop.

5. The communication device according to claim 1, wherein the second logical conversion circuit comprises a transistor which is arranged to short-circuit the second input/output terminal to a ground terminal in response to the first output signal output from the first JK flip-flop.

* * * * *